(12) United States Patent
Kaiser et al.

(10) Patent No.: US 10,876,008 B2
(45) Date of Patent: Dec. 29, 2020

(54) ANTI-CORROSION SYSTEM COMPRISING AN AT LEAST ONE-LAYERED FIRST TAPE AND AT LEAST ONE PRIMER

(71) Applicant: DENSO-HOLDING GMBH & CO, Leverkusen (DE)

(72) Inventors: Thomas Markus Kaiser, Inden (DE); Oleg Gryshchuk, Leverkusen (DE)

(73) Assignee: DENSO-HOLDING GMBH & CO, Leverkusen (DE)

( * ) Notice: Subject to any disclaimer, the term of this patent is extended or adjusted under 35 U.S.C. 154(b) by 315 days.

(21) Appl. No.: 15/563,999

(22) PCT Filed: Apr. 14, 2016

(86) PCT No.: PCT/EP2016/058301
§ 371 (c)(1),
(2) Date: Oct. 3, 2017

(87) PCT Pub. No.: WO2016/166261
PCT Pub. Date: Oct. 20, 2016

(65) Prior Publication Data
US 2018/0086923 A1 Mar. 29, 2018

(30) Foreign Application Priority Data
Apr. 15, 2015 (DE) .................. 10 2015 105 747

(51) Int. Cl.
| B32B 7/12 | (2006.01) |
|---|---|
| C09D 5/08 | (2006.01) |
| F16L 58/10 | (2006.01) |
| B32B 25/16 | (2006.01) |
| B32B 25/14 | (2006.01) |
| B32B 25/18 | (2006.01) |
| B32B 27/16 | (2006.01) |
| B32B 25/04 | (2006.01) |
| B32B 1/08 | (2006.01) |
| B32B 25/08 | (2006.01) |
| B32B 27/32 | (2006.01) |
| C09D 123/22 | (2006.01) |
| C09D 153/00 | (2006.01) |
| C09J 5/00 | (2006.01) |
| C09J 9/00 | (2006.01) |
| C09J 123/22 | (2006.01) |
| C09J 153/00 | (2006.01) |

(52) U.S. Cl.
CPC .................. *C09D 5/08* (2013.01); *B32B 1/08* (2013.01); *B32B 7/12* (2013.01); *B32B 25/042* (2013.01); *B32B 25/08* (2013.01); *B32B 25/14* (2013.01); *B32B 25/16* (2013.01); *B32B 25/18* (2013.01); *B32B 27/16* (2013.01); *B32B 27/32* (2013.01); *C09D 123/22* (2013.01); *C09D 153/00* (2013.01); *C09J 5/00* (2013.01); *C09J 9/00* (2013.01); *C09J 123/22* (2013.01); *C09J 153/00* (2013.01); *F16L 58/1063* (2013.01); *B32B 2255/26* (2013.01); *B32B 2264/10* (2013.01); *B32B 2264/108* (2013.01); *B32B 2270/00* (2013.01); *B32B 2307/714* (2013.01); *B32B 2307/732* (2013.01); *B32B 2307/752* (2013.01); *B32B 2597/00* (2013.01); *C09J 2301/414* (2020.08); *C09J 2423/00* (2013.01)

(58) Field of Classification Search
None
See application file for complete search history.

(56) References Cited

U.S. PATENT DOCUMENTS

| 2,236,567 A | 4/1941 | Drew |
|---|---|---|
| 2,328,066 A | 8/1943 | Drew |
| 2,701,895 A | 2/1955 | Tawney et al. |
| 3,017,989 A | 1/1962 | Swenson et al. |
| 3,063,891 A | 11/1962 | Boylan et al. |
| 3,231,443 A | 1/1966 | McNulty |
| 4,200,706 A | 4/1980 | Starks |
| 4,806,400 A | 2/1989 | Sancaktar |
| 4,933,235 A | 6/1990 | Kellner |
| 4,946,529 A | 8/1990 | Huddleston |
| 5,817,413 A | 10/1998 | Huddleston et al. |
| 5,888,331 A | 3/1999 | Greig |
| 6,033,776 A | 3/2000 | Huddleston et al. |
| 6,803,101 B1 | 10/2004 | Bohm et al. |
| 2003/0149149 A1* | 8/2003 | Carlisle .................. C09J 7/387 524/323 |

(Continued)

FOREIGN PATENT DOCUMENTS

| AT | 507508 A1 | 5/2010 |
|---|---|---|
| CN | 103044696 A | 4/2013 |

(Continued)

OTHER PUBLICATIONS

J.J. Higgins et al., "Butyl Rubber and Polyisobutylene", Handbook of Adhesives, 1990, Springer pp. 185-187 (Year: 1990).*
Search Report for PCT/EP2016/058301, dated Jun. 24, 2016.

*Primary Examiner* — Anish P Desai
(74) *Attorney, Agent, or Firm* — Dinsmore & Shohl LLP

(57) ABSTRACT

The invention relates to an anti-corrosion system comprising an at least one-layered first tape, comprising at least one elastomer selected from the group comprising (block-) co- and/or terpolymers with at least one carbon-carbon double bond, as well as at least one cross-linking agent, selected from the group comprising at least one reactive resin, wherein the anti-corrosion system furthermore comprises at least one primer, comprising at least one catalyzing agent to activate the cross-linking agent.

16 Claims, No Drawings

(56) References Cited

U.S. PATENT DOCUMENTS

| | | | | |
|---|---|---|---|---|
| 2004/0241478 A1* | 12/2004 | Fukuda | ............ | A61L 29/085 |
| | | | | 428/515 |
| 2009/0114305 A1* | 5/2009 | Roberts | ............ | B32B 15/08 |
| | | | | 138/143 |
| 2009/0250136 A1* | 10/2009 | Roberts | ............ | B32B 15/20 |
| | | | | 138/143 |
| 2012/0003598 A1* | 1/2012 | Mussig | ............ | C09J 7/10 |
| | | | | 432/13 |
| 2016/0108291 A1* | 4/2016 | Masson | ............ | C09J 7/29 |
| | | | | 428/141 |
| 2018/0305556 A1* | 10/2018 | Kaiser | ............ | B32B 27/30 |
| 2018/0334595 A1* | 11/2018 | Kaiser | ............ | F16L 58/04 |
| 2019/0002738 A1* | 1/2019 | Kaiser | ............ | C08K 3/34 |
| 2019/0249039 A1* | 8/2019 | Kaiser | ............ | C08L 2205/03 |

FOREIGN PATENT DOCUMENTS

| | | |
|---|---|---|
| EP | 0232936 A2 | 8/1987 |
| EP | 0421607 A1 | 4/1991 |
| JP | S583827 A | 1/1983 |
| KR | 1020150091122 | 2/2016 |
| WO | 93-03097 A1 | 2/1993 |
| WO | WO-2014184499 A1 * | 11/2014 |

\* cited by examiner

ANTI-CORROSION SYSTEM COMPRISING AN AT LEAST ONE-LAYERED FIRST TAPE AND AT LEAST ONE PRIMER

CROSS-REFERENCE TO RELATED APPLICATIONS

This application is the U.S. national stage of PCT/EP2016/058301, filed Apr. 14, 2016, which claims priority of DE 102015105747.6, filed Apr. 15, 2015.

TECHNICAL FIELD

The present invention relates to an anti-corrosion system comprising an at least one-layered first tape, comprising at least one elastomer selected from a group comprising (block-) co- and/or terpolymers with at least one carbon-carbon-double bond, as well as a method for protecting products from corrosion by using the anti-corrosion system according to the invention.

BACKGROUND

Numerous anti-corrosion systems for pipe units such as pipelines, for example, but also technical units, etc. are known from the prior art. As such, EP 0 421 607 B1, for example, discloses a tape wrapping system for protecting pipe-shaped objects, which comprises an inner wrapping that covers the object to be protected, and an outer wrapping disposed over the inner wrapping, wherein the inner wrapping comprises an impact resistant layer having an adhesive layer on its inner surface and a layer on its outer surface, and wherein the outer wrapping comprises a carrier layer having a layer on at least one of its surfaces, wherein the inner wrapping and the outer wrapping surround a material that can be melted with heat, and wherein the tape wrapping system is applied to the pipe-shaped object such that when heated and cooled, the outer wrapping fuses together with the inner wrapping, thus forming a fully closed, protective coating. The object of producing an improvement in relation to corrosive external forces is to be achieved by means of the tape encasing system disclosed therein in that a continuous, seamless, protective tape coating system is created. One of the adhesive layers can be produced thereby as a butyl rubber, for example. By way of example, ethylene vinyl acetate, ethylene methyl acrylate and low density polyethylene are used as the material that melts when exposed to heat. The problem with the tape coating system disclosed in EP 0 421 607 B1 in case of pipe systems or technical units regardless of the type, in particular if coated at higher temperatures, is the contact between for example the outer surface of a pipeline pipe and the adhesive layer, made of butyl rubber for example, which can separate from the outer surface of the pipeline pipe.

SUMMARY

It is therefore the object of the present invention to provide an anti-corrosion system which even at high temperatures, occurring in the product to be protected as for example a pipe system like a pipeline or a technical plant of any kind, provides sufficient adhesion with an outer surface of the product, wherein the anti-corrosion system should have good storage characteristics.

DETAILED DESCRIPTION OF PREFERRED EMBODIMENTS

This object is achieved by means of an in particular cold applied anti-corrosion system comprising an at least one-layered first tape comprising at least one elastomer selected from a group comprising (block) co- and/or terpolymers with at least one carbon-carbon-double bond, as well as at least one cross linking agent, selected from a group comprising at least one reactive resin, wherein the anti-corrosion system furthermore comprises at least one primer, comprising at least one catalyzing agent for activating said cross-linking agent. The anti-corrosion system according to the invention works in such a way that said cross-linking agent in said at least one-layered first tape sets off the cross-linking reaction with said at least one elastomer only after contacting said catalyzing agent of said at least one primer. Before this, no cross-linking reaction takes place, in fact, said elastomer is present in said tape as a non cross-linked elastomer. The cross-linking reaction takes place especially at temperatures from about 70° C., preferred from about 80° C. An upper temperature limit is given by the decomposition temperature or ignition of said elastomer respectively cross-linking agent, depending on which is lower. Preferred for the cross-linking reaction is a temperature range from about 70° C. to about 120° C., further preferred from about 75° C. to about 120° C., even further preferred from about 80° C. to about 120° C. Preferably, on one hand, very good adhesion of said at least one-layered first tape on a product coated with it is achieved, on the other, an early cross-linking during production, storage as well as processing of the anti-corrosion system according to the invention, is prevented, so that the cross-linking reaction is initiated only at the time of applying the anticorrosion system on a product to be protected, wherein at this point in time, a high concentration of functional groups is present at said cross-linking agent and/or elastomer, via which the cross-linking takes place. For this reason, the anti-corrosion system according to the invention also provides very good storage characteristics.

Said at least one-layered first tape preferably comprises at least one elastomer selected from a group comprising butyl rubber, ethylene-propylene rubber (EPM) and/or ethylene-propylene-diene rubber (EPDM). In the sense of the present invention, the term butyl rubber means in particular co- or block-co-polymers of isobutene having about 0.5% by weight to about 5.0% by weight of isoprene, based on the total quantity of the butyl rubber, which are particularly produced by cationic polymerization. Via the used isoprene and the carbon-carbon-double bonds contained in it, acting as functional groups, a cross-linking reaction can be initiated. In the sense of the present invention the term butyl rubber means in particular also halogenized butyl rubbers, especially such being chlorinated respectively brominated (chlorobutyl rubber respectively bromobutyl rubber). Mixtures of various butyl rubbers can also be used. Preferred, at least one non-cross-linked butyl rubber, if appropriate, also a mixture of at least two butyl rubbers being non-cross-linked, are used. Said at least one non-cross-linked butyl rubber preferably has a molecular weight $M_w$ ranging from about 150,000 to about 2,000,000, preferred from about 300,000 to about 1,800,000, further preferred ranging from about 200,000 to about 500,000. Said at least one non-cross-linked butyl rubber preferably has a Mooney viscosity ML (1+8) at a temperature of at 25° C. ranging from about 25 MU to about 65 MU, preferred from about 30 MU to about 60 MU, even further preferred from about 40 MU to about 59 MU, and even further preferred from about 42 MU to about 56 MU, measured according to ISO 289 in the version of 2005 or according to ASTM 1064-04.

Advantageously, said at least one non-crosslinked butyl rubber shows values of unsaturation in a range from about 1% by mole to about 3% by mole, further preferred in a range from about 1.3% by mole to about 2.5% by mole. This means that preferred about 1% by mole to about 3% by mole, further preferred about 1.3% by mole to about 2.5% by mole of unsaturated bonds, i.e. carbon-carbon double bonds, are comprised in said at least one non-crosslinked butyl rubber as functional groups. Especially preferred is said at least one non-crosslinked butyl rubber made by a co-polymerization of isobutylene and isoprene in methyl chloride as a solvent.

Ethylene-propylene rubbers are referred to as especially such co- or block-copolymers as well as terpolymers (like EPDM), which have a carbon-carbon double bond as functional groups. Hereof it is also possible to use mixtures. Especially preferred are terpolymers being formed in a polymerization reaction with ethylene, propylene and one diene. They are also called EPDM terpolymers and combine one saturated polymer backbone with unsaturated rests in side groups. Especially preferred in the sense of the present invention in this case 5-ethylidene-2-norbornens, dicyclopentadien and/or 5-vinylidene-2-norbornes are used as a diene in quantities up to about 15% by weight, preferred in quantities ranging from about 0.3% by weight to about 12% by weight, further preferred ranging from about 0.5% by weight to about 10% by weight. In case of a polymerization with 5 ethyliden-2-norbornes, preferably quantities ranging from about 4% by weight to about 11% by weight and in case of a polymerization with dicyclopentadien, quantities ranging from about 1.0% by weight to about 6.0% by weight are used. The above-mentioned weight percentage ranges are based on the total quantity of monomers being used in a polymerization to a butyl rubber respectively halo-butyl rubber or an EPDM respectively EPM.

Especially preferred in the sense of the present invention, said elastomer is selected from a group comprising (block-) co- and/or terpolymers of said butyl rubber made of isobutylene and isoprene and/or terpolymers made of ethylene and propylene with a non-conjugated diene. Especially preferred, said at least one-layered tape as elastomer comprises one, preferred non-crosslinked, butyl rubber, especially one non-halogenated butyl rubber, as well as an EPDM as elastomer, or in an alternative embodiment exactly one non-crosslinked butyl rubber. Preferred, said at least one-layered first tape comprises said at least one elastomer in a quantity ranging from about 40% by weight to about 70% by weight, preferred to about 65% by weight, preferred ranging from about 45% by weight to about 60% by weight, based on the total quantity of said first tape. Especially preferred, said at least one-layered first tape comprises at least one non-crosslinked butyl rubber in a quantity ranging from about 36% by weight to about 61% by weight, preferred ranging from about 40% by weight to about 60% by weight, preferred to about 55% by weight, and if appropriate, one EPDM in a quantity ranging from about 4% by weight to about 15% by weight, preferred ranging from about 6% by weight to about 14% by weight. The afore-mentioned weight percentage ranges are based on the total quantity of said first tape. However, in an alternative embodiment it may also be provided that said at least one-layered first tape comprises only at least one butyl rubber as elastomer or at least one ethylene-propylene rubber, in particular one EPDM.

Said at least one-layered first tape can be constructed in many ways. It may preferably be constructed in at least two layers, but even three, four, five or even in a multiple-layered form. It may for example be constructed such that it comprises two outer layers comprising one elastomer, which include one inner layer formed of a carrier film, especially a film made of at least one polyethylene and/or polypropylene, preferred of one electron-beam cross-linkable polyethylene or polypropylene. Especially preferred, said carrier film is formed of a medium density polyethylene (MDPE), preferred such which can be electron-beam cross-linked. The used MDPE preferably has a density between about 0.926 g/cm$^3$ and about 0.939 g/cm$^3$, measured according to ISO 1183 in the version valid at the time of the present patent application. Said carrier film can also comprise additives such as for example color pigments or carbon black. It comprises at least 93% by weight of polyethylene and/or polypropylene as well as additives if appropriate, in particular in the form of color pigments or carbon black, in a quantity ranging from about 0.5% by weight to about 7% by weight. In this case, said carrier film, which can, depending on its strength, also be effective as an anti-jackknife brake, can have an adhesive layer on one or both of its sides facing said elastomer-containing layers. Said adhesive layer especially preferred comprises at least one polyethylene and/or polypropylene as well as at least one elastomer as well as further additives, if appropriate. It may also be provided that in case of providing one adhesive layer on both sides facing said elastomer-containing layers of said carrier film, said adhesive layers have different compositions.

It may also be provided that said first layer comprises only one layer with said elastomers as defined above, being connected with a carrier film, in particular such as defined above, wherein said carrier film has an adhesive layer on one or both sides. In case of such construction, said carrier film, mainly serving to stabilize said layer containing said elastomers selected according to the invention and having a certain strength, preferably in a range from about 0.2 mm to about 1.2 mm, further preferred from about 0.3 mm to about 0.7 mm, comprises adhesive layers with the same or different compositions on its two outer sides. Thus, said carrier film can preferably have an adhesive layer on its side facing the elastomer-containing layer, which is made of the same material as said carrier film and of the same elastomer as present in the elastomer-containing layer, preferred exclusively of these materials. Whereas said further adhesive layer, being applied on the side of the carrier film facing away from the elastomer-containing layer can, in particular in case of providing an at least one-layered second tape which, especially in the form of a tape providing a mechanical protection, can be wrapped around the first tape on the respective product, apart from one elastomer and said material of the carrier film, in particular a polyethylene and/or polypropylene, also comprise tackifiers, especially in the form of hydrocarbon resins, as well as other additives such as antioxidants, activators or color pigments. In this case, activators are such compounds which similar to the used catalyzing agent according to the invention, initiate a cross-linking in the used elastomer according to the invention, in particular at higher temperatures, especially such from about 50° C., preferred from about 70° C., further preferred from about 80° C., and preferred such in a range from about 55° C. to about 220° C., further preferred in a range from about 60° C. to about 140° C. Thus, as activators, the same compounds can be used like those being used as catalyzing agents used according to the invention, as described there, preferred, organic compounds with zinc or tin, as for example zinc stearates or zinc oleates, alone or as a mixture are used. Said activators, alone or as a mixture, are comprised by said outer adhesive layer preferably in a quantity ranging from about 0.1% by weight to about 10% by weight, preferred ranging from about 0.3% by weight to about 4% by weight, each based on the total composition of the outer adhesive layer. In case of wrapping or applying said first tape with overlapping on pipe-shaped or other articles with an overlapping, if activators are provided in the outer adhesive layer, a cross-linking at higher temperatures, as described above, can be initiated in the overlapping region, such that a stronger hold without wrinkling can be achieved.

Said first tape can in particular be constructed symmetrically or asymmetrically. A symmetrically constructed first tape comprises, as above already described, a carrier film made for example of at least one polyethylene and/or polypropylene, which is on its two outer sides enclosed by one layer each, containing at least one elastomer in the sense of the present invention, as described above, as well as said cross-linking agent. In this case it may also be provided that only one of the two elastomer-containing layers comprises the cross-linking agent, namely preferred that elastomer-containing layer facing the outer surface of a product to be covered. Said two elastomer-containing layers preferably have more or less the same thickness. Between carrier film and elastomer-containing layer, at least one adhesive layer may be provided, as also described above. If said adhesive layer is arranged on both sides of said carrier film, and if these also have more or less the same thickness, a symmetrically constructed three- or five-layered tape is provided, said adhesive layers in the last mentioned case included.

It may however also be provided to provide for example an asymmetrically constructed first tape. This can for example be constructed in a way that one layer comprising at least one elastomer according to the present invention as well as at least one cross-linking agent, and which faces the product to be covered, is connected with a carrier film as above defined. In this case, at least one adhesive layer can be arranged between the elastomer-containing layer and said carrier film. On the side facing away from said elastomer-containing layer of said carrier film, also for example an elastomer-containing layer without cross-linking agent can be arranged, which has a smaller thickness than the layer facing the product to be wrapped. Said carrier film can on its side facing away from the elastomer-containing layer with cross-linking agents, also have a further adhesive layer, which preferably also comprises an elastomer, especially preferred butyl rubber, as well as the material of said carrier film, and further preferred in addition tackifiers such as hydrocarbon resins, activators and other additives, as already described above.

In the sense of the present invention it may, however, also be provided that the first tape comprises at least one layer of an anti-jackknife break. In this case, said first tape can for example be constructed in a way that it consists of only one single layer comprising the at least one elastomer as well as said at least one cross-linking agent, wherein more or less in the middle of these a very thin intermediate layer, preferred such with a thickness in a range of about 15 µm to about 100 µm, further preferred in a range from about 20 µm to about 75 µm, is arranged. Said intermediate layer serves as an anti-jackknife break and prevents an overstretching of the tape in particular in case of a spiral wrapping of the same around a product to be covered. Especially preferred, said anti-jackknife break respectively said intermediate layer is formed of at least one polyethylene and/or polypropylene and is especially preferred a polyethylene film. A layer of said first tape with said at least one elastomer and said at least one cross-linking agent, provided with an anti-jackknife brake in such way, can also be addressed as two- or alternatively as three-layered. Said anti-jackknife brake can here be arranged symmetrically more or less in the middle, but also asymmetrically shifted towards the top or bottom side of the tape within it. Preferred, a symmetrical arrangement is however made in the middle, i.e. at half of the thickness of the first tape, as far as it comprises only one more layer, which comprises at least one elastomer and at least one cross-linking agent. As already described further above, it may however also be provided that on top of said anti-jackknife break on the side of said first tape facing away from the product to be covered, a further layer is arranged, which comprises only said at least one elastomer, but no cross-linking agent. In this case, a real three-layered tape is provided.

The afore-mentioned adhesive layers preferably comprise said at least one elastomer of said first tape and at least one polyethylene and/or polypropylene. Especially preferred, these comprise at least one butyl rubber and/or at least one EPDM, further preferred exactly one butyl rubber, or a mixture of two butyl rubbers, wherein the quantity of said used at least one elastomer is in a range of about 35% by weight to about 72% by weight, preferred to about 65% by weight, further preferred in a range from about 40% by weight to about 60% by weight, based on the total quantity of said adhesive layer. Said at least one polyethylene and/or polypropylene, preferred at least one polyethylene, further preferred exactly one polyethylene, is comprised in said adhesive layer in a quantity ranging from about 25% by weight to about 65% by weight, further preferred in a quantity ranging from about 30% by weight to about 60% by weight, further preferred to about 45% by weight, based on the total quantity of the adhesive layer. A composition of an adhesive layer in this case comprises exclusively said at least one elastomer and said at least one polyethylene and/or polypropylene, preferred exactly one butyl rubber as elastomer, or alternatively exactly one butyl rubber and exactly one EPDM, and exactly one polyethylene or exactly one polypropylene, and no other additives. Said polyethylene and/or polypropylene can in this case, just like the one used in the carrier film, be used as a master batch with additives like pigments or carbon black. The latter can be comprised in a quantity ranging from about 0.5% by weight to about 7% by weight, based on the quantity of the used polyethylene and/or polypropylene.

As far as at least one butyl rubber is used as at least one elastomer in the adhesive layer, this is preferred selected from a group comprising at least partly pre-crosslinked butyl rubbers, further preferred strongly pre-crosslinked butyl rubbers. Preferably, exactly one at least partly pre-crosslinked, preferred strongly pre-crosslinked butyl rubber is used in an adhesive layer.

Said at least one at least partly pre-crosslinked butyl rubber preferably has according to ISO 289 in the version 2005 or according to ASTM 1604-04 a Mooney viscosity ML (1+3) at 127° C. ranging from about 30 MU to about 100 MU, preferred from about 50 MU to about 98 MU, even further preferred from about 60 MU to about 95 MU, even further preferred from about 65 MU to about 93 MU, even further preferred in a range from about 78 MU to about 92 MU, and even further preferred from about 78 MU to about 90 MU. The specific density of said at least partly pre-crosslinked butyl rubber is at a temperature of 25° C. according to ASTM D1875 in the version of 2003 ranging from about 0.5 to about 1.1, preferred ranging from about 0.9 to about 0.98. Said at least one at least partly pre-crosslinked butyl rubber can also be a halobutyl rubber.

As far as a polyethylene, preferably a polyethylene of medium density (MDPE) or higher density (HDPE), even further preferred an electron-beam cross-linkable polyethylene, especially a such of medium density is provided as carrier film, wherein said carrier film can comprise further additives if appropriate, as described above, said adhesive layer preferably comprises ate least one elastomer, wherein the at least one elastomer can preferably be at least one butyl rubber, further preferred at least one pre-crosslinked butyl rubber as described above, and/or an EPDM. Especially preferred, in case of providing a carrier film made of polyethylene, in particular of MDPE, said adhesive layer comprises exactly one pre-crosslinked butyl rubber and exactly one EPDM. Said at least one, preferably exactly one butyl rubber is in this case comprised in said adhesive layer in a quantity ranging from about 40% by weight to about 70% by weight, further preferred in a quantity ranging from about 42% by weight to about 60% by weight, and said at least one EPDM. Furthermore, in case of providing a polyethylene-based carrier film, said adhesive layer comprises a polyethylene, preferred a polyethylene of medium density or a polyethylene of higher density (HDPE) even further preferred at least one HDPE, even further preferred exactly one HDPE. Said at least one polyethylene is comprised in said adhesive layer in a quantity ranging from about 25% by weight to about 40% by weight, based on the total quantity of said adhesive layer, as far as a polyethylene, preferred an electron-beam cross-linkable polyethylene, especially preferred an electron-beam cross-linkable polyethylene of medium density is used as carrier film.

As far as a polypropylene is used as carrier film, wherein this just like in case of providing a carrier film made of polyethylene, can comprise additives particularly in the form of color pigments, said at least one adhesive layer is preferably formed of at least one elastomer, preferred at least one butyl rubber, especially preferred at least one at least partly pre-crosslinked butyl rubber, as described further above, and even further preferred comprises exactly one pre-crosslinked butyl rubber as described further above. Said at least one elastomer, preferably at least one butyl rubber, even further preferred exactly one butyl rubber, and even further preferred exactly one at least partly pre-crosslinked butyl rubber, is preferably comprised by the adhesive layer in a quantity ranging from about 50% by weight to about 75% by weight, further preferred in a quantity ranging from about 55% by weight to about 71% by weight, based on the total quantity of said adhesive layer. Preferably upon using a polypropylene-based carrier film, said adhesive layer further comprises at least one polypropylene and/or polyethylene, preferably a polypropylene being identical to the one used in said carrier film. Said at least one, preferably exactly one polypropylene and/or polyethylene of said adhesive layer is comprised by it in a quantity ranging from about 20% by weight to about 55% by weight, further preferred in a quantity ranging from about 25% by weight to about 40% by weight. As polyethylene such can be used in this case as above described in connection with a polyethylene-based carrier film. As far as polyethylene is contained in said adhesive layer, preferably, at least one EPDM, exactly one EPDM, in a quantity ranging from about 10% by weight to about 30% by weight, further preferred in a quantity from about 12% by weight to about 22% By weight, each based on the total quantity of said adhesive layer, is comprised by said adhesive layer.

Preferably, apart from the used elastomers and the used polyethylenes and/or polypropylenes, said adhesive layers do not comprise any further additives. However, for example additives, in particular in the form of color pigments and carbon black, can be added in quantities ranging from about 0.5% by weight to about 4% by weight, each based on the total quantity of said adhesive layer.

A further composition of an adhesive layer comprises apart from the at least one elastomer and the at least one polyethylene and/or polypropylene, further additives, namely preferably tackifiers, antioxidants, activators as described above, and pigments. In this case, a tackifier can for example be comprised in a quantity ranging from about 5% by weight to about 15% by weight, further preferred in a quantity ranging from about 7% by weight to about 13% by weight, and is preferably selected from a group comprising hydrocarbon resins. Moreover, an antioxidant can be provided, preferably in a quantity ranging from 0.05% by weight to about 0.5% by weight, further preferred in a quantity from about 0.1% by weight to about 0.5% by weight. Said antioxidant can here in particular be selected from a group comprising steric hindered phenols, as for example pentaerythritol-tetrakis (3-(3.5-di-ter-butyl-4-hydroxyphenyl) propionate). Furthermore, said adhesive layer can also contain at least one pigment, in particular such being provided in the form of a master batch. Said at least one pigment is comprised in a composition of an adhesive layer in a quantity ranging from about 0.5% by weight to about 8% by weight, further preferred in a quantity ranging from about 0.9% by weight to about 2% by weight. Said pigment can for example be a black pigment, in order to convey a uniform appearance of the first tape. However, each other pigment as for example a red one can also be used to highlight and to mark the presence of an adhesive layer. The afore-mentioned weight percentage ranges referring to the composition of said adhesive layer are each based on the total quantity of said adhesive layer. The adhesive layer has preferably a thickness ranging from about 10 µm to about 150 m, further preferred a thickness ranging from about 20 µm to about 100 m, even further preferred a thickness ranging from about 25 µm to about 80 µm.

Said carrier film, as far as it is not formed as an anti-jackknife break, preferably has a thickness in a range from about 0.2 mm to about 1.2 mm, further preferred a thickness in a range from about 0.3 mm to about 0.8 mm. Said carrier film advantageously consists of polyethylene or polypropylene, and preferably consists of a polyethylene. Especially preferred, said carrier film is formed of a group comprising polyethylenes which are electron-beam cross-linkable, further preferred of a polyethylene of medium density (MDPE). If said carrier film is used in combination with adhesive layers, a polyethylene is also comprised in these adhesive layers, which preferably is electron-beam cross-linkable. Further advantageously, said carrier film was slightly stretched, so that it advantageously has a tendency to shrink when being heated and thus, a possible length expansion upon heating can be overcompensated. Further, upon application by wrapping tubular articles, the contact pressure in direction of the tubular article is also increased.

If said carrier film has an adhesive layer on one or on both sides, the complete composite will be slightly stretched. A composite foil produced in this way will followingly be coated with the polymers usable according to the invention on at least one side. This layer preferably has a thickness ranging from about 0.25 mm to about 2. mm, further preferred ranging from about 0.35 mm to about 1.3 mm. If said carrier film is provided with an adhesive layer on both sides and if said carrier film is coated with the elastomer mixture usable according to the invention only on one side, the outer adhesive layer preferably comprises activators as it is described above. The composition of the adhesive layers applied on both sides of said carrier film can thus be different, especially preferred in the sense of the present invention. The above described tape construction has the great advantage that on the one hand a cross-linking reaction is also initiated in the overlap area upon wrapping or applying such a tape via the provided activator, and moreover, whether applied with overlap or not, said first tape can be wrapped for example by an identical first tape, wherein said activator contained in said outer adhesive layer initiates the cross-linking of the elastomer-containing part of the second tape facing said tape. Said carrier film can in this case comprise even further additives as for example pigments, antioxidants or stabilizers.

In a further embodiment of the present invention, said at least one elastomer selected according to the present invention can also be applied on one side of a shrink sleeve or a shrink tape. In addition to providing a good adhesion by cross-linking caused by the catalyzing agent comprised in the primer for activating the present cross-linking agent, due to the heating of the shrink sleeve respectively shrink tape, which is required for the shrinking, a further thermal activation can be effected, which provides a strong bonding of such system in particular to a tubular article.

Furthermore, the anti-corrosion system according to the invention preferably comprises a second tape for giving mechanical protection. Said second tape is constructed at least single-layered, and is preferably constructed in a single-, two- or three-layered form. However, it may also be constructed in a four- or even multiple-layered form. The second tape is meant to be a mechanical protection tape. Said second tape comprises preferably a layer made of at least one polyethylene and/or polypropylene, preferred at least one polyethylene, preferred an electron-beam-cross-linked polyethylene of sufficient strength. As far as polyethylene is used, it preferably comprises an ultimate elongation according to EN ISO 527 of >300%, further preferred >400%, even further preferred >500%, preferred such in a range from about 300% to about 800%. Further preferred, it has a tensile strength according to EN ISO 527 in a range from about 8 MPa to about 25 MPa, further preferred in a range from about 12 MPa to about 20 MPa. The second tape can for example also be used, if two identical first tapes, while their identity in particular refers to their construction, but also to their chemical composition, are wrapped around a tubular article.

Said at least one layer made of polyethylene and/or polypropylene, preferably exactly one layer, of the second tape can be provided with an adhesive layer on one side. However, it may also be provided that it is on one side provided with an adhesive layer of at least one elastomer according to the present invention, and in particular at least one butyl rubber and/or at least one EPDM, preferably of a butyl rubber. This layer can, besides the at least one butyl rubber and/or at least one EPDM, comprise even further additives such as antioxidants, hydrocarbon resins as tackifiers, process oils, pigments or the like. As far as an adhesive layer with at least one elastomer, as described above, is connected with a layer of at least one polyethylene and/or polypropylene, for the second tape it is then preferably provided that between these two layers one layer is provided that serves as adhesion promoter, wherein this can have a composition as described further above in connection with the first tape.

The product to be covered by the anti-corrosion system according to the invention may be each kind of product which is basically subject to corrosion. Especially preferred, the anti-corrosion system according to the invention is used for pipe plants, i.e. plants consisting at least partly of pipes.

Particularly, the anti-corrosion system according to the invention is used for wrapping pipelines of each possible kind, but also for wrapping gas pipelines, etc. It may, however, also be used for other technical plants and/or in areas where corrosion occurs, and here not only in the form of a wrapping, but also for example in the form of a pad/cover.

Said at least one cross-linking agent contained in said at least one-layered first tape, is advantageously selected from a group comprising at least one phenolic resin. Phenolic resins are reactive resins and are rehardened by cross-linking reactions to become thermosetting plastics, the so-called phenoplasts. Such cross-linking reaction can take place in the anti-corrosion system according to the invention. Phenolic resins are condensation products of phenols with aldehydes, preferably with formaldehyde. In the sense of the present invention, the first tape especially preferred comprises at least one phenolic resin containing hydroxymethyl groups. These hydroxymethyl groups constitute the reactive respectively functional groups which initiate a cross-linking reaction which may also be referred to as self-hardening reaction in the sense of the present invention, with said functional groups of said at least one elastomer in said first tape. Especially preferred in the sense of the present invention is the at least one phenolic resin produced from at least one phenol or its derivatives and of at least one aldehyde, selected from a group comprising formaldehyde, acetaldehyde, benzaldehyde and/or acrolein, wherein formaldehyde is especially preferred. As phenolic derivatives particularly tetra-butylphenol, nonylphenol or octylphenol are used, but also aryl derivatives, especially phenylphenol, as well as divalent phenols as for example resorcinol or bisphenol A or naphthol can be used. Especially preferred are octylphenol-formaldehyde resins. Said phenolic resins according to the invention are in particular such being in the class of the so-called resoles, i.e. which are produced via a base-catalyzed reaction of the mentioned starting products.

Advantageously, the at least one-layered first tape comprises the at least one cross-linking agent in a quantity ranging from about 0.2% by weight to about 10% by weight, further preferred in a quantity ranging from about 0.5% by weight, further preferred from about 1.5% by weight, preferred from 3.5% by weight, to about 8% by weight, preferred to about 5% by weight, based on the total quantity of the first tape.

For initiating the cross-linking reaction within the anti-corrosion system according to the invention, which is initiated in particular via the at least one cross-linking agent, at least one catalyzing agent is provided in the primer. This advantageously comprises electron-donating properties. Especially preferred, the at least one catalyzing agent is selected from a group comprising zinc chloride, zinc bromide, ferric chloride, antimony chloride, antimony bromide, tin bromide, germanium chloride, cobalt bromide, nickel chloride and/or organic salts of tin or zinc, as for example zinc stearates or zinc oleates, wherein particularly preferred, tin or zinc halides, and further preferred, tin chloride and zinc chloride, as well as at least one zinc stearate, are used alone or as a mixture.

According to the invention, said at least one primer comprises said catalyzing agent in a quantity ranging from about 0.001% by weight, preferably from about 0.003% by weight, to about 5% by weight, further preferred in a quantity ranging from about 0.005% by weight to about 4.5% by weight, even further preferred in a quantity from about 0.3% by weight to about 4.5% by weight, even further preferred in a quantity from about 0.35% by weight to about 4% by weight, based on the total quantity of the primer. Especially preferred, a zinc stearate is used as catalyzing agent, especially preferred in a quantity ranging from about 0.002% by weight to about 1% by weight, further preferred to about 0.5% by weight, each based on the total quantity of the primer. Advantageously, in the sense of the present invention, the relation between the quantity of the used catalyzing agent and the quantity of the used cross-linking agent is in a range of about 3:1 to about 1:2.

Said at least one primer is applied to the product bevor wrapping or covering the respective product with said at least one first layer in order to protect it from corrosion, for example by using common coating tools like painting brushes, spatulas or the like. Said primer preferably comprises furthermore at least one elastomer as it is described further above regarding the primer for said at least one-layered first tape. Said primer comprises this at least one elastomer preferably in a quantity ranging from about 4% by weight to about 20% by weight, further preferred in a quantity ranging from about 7% by weight to about 15% by weight, based on the total quantity of said primer. The great advantage of providing at least one elastomer in the primer advantageously leads to a stronger bonding between primer and product on the one hand and on the other between primer and said at least one-layered first tape. Especially preferred in this case at least one elastomer is contained in the primer, which is identically contained in said at least one-layered first tape, wherein the identity refers to its chemical structure. In the primer for example at least one un-crosslinked butyl rubber can be contained, or a mixture of at least one butyl rubber with at least one ethylene-propylene-rubber, especially an EPDM, or only one ethylene-propylene-rubber, especially one EPDM. Especially preferred, exactly one un-crosslinked butyl rubber or a mixture of two butyl rubbers are used as elastomer in said primer, and a mixture of one butyl rubber with one EPDM as at least one elastomer in said at least one-layered first tape.

Further preferred, said at least one primer comprises at least one co-reagent for said catalyzing agent, selected from a group comprising triallyl cyanurate, triallyl isocyanurate, triallyl phosphate and/or divinyl benzene, and especially preferred a triallyl cyanurate and/or a triallyl isocyanurate. The co-reagent in particular serves to render the used catalyzing agent compatible within said primer. Said primer comprises the co-reagent advantageously in a quantity ranging from about 0.01% by weight to about 5% by weight, further preferred in a quantity ranging from about 0.02% by weight to about 5% by weight, preferred to about 3% by weight, further preferred in a quantity ranging from about 0.3% by weight to about 4% by weight, based on the total quantity of said primer. Especially preferred, such co-reagent is used selected from a group comprising triallyl cyanurate, triallyl isocyanurate and/or triallyl phosphate, especially preferred at least one triallyl cyanurate, wherein the afore-mentioned co-reagents can be contained in said primer in a quantity ranging from about 0.003% by weight to about 0.5% by weight, preferred in a quantity ranging from about 0.0025% by weight to about 0.3% by weight, each based on the total quantity of said primer.

Said primer furthermore comprises at least one petrol-based solvent and further preferred at least one hydrocarbon resin as tackifier. Especially preferred, said primer comprises one tackifier, especially one hydrocarbon resin, in a quantity ranging from about 10% by weight to about 25% by weight, further preferred in a quantity ranging from about 12% by weight to about 20% by weight, each based on the total quantity of said primer. Preferably, said primer comprises the at least one solvent, especially a such based on petrol, in a quantity ranging from about 50% by weight to about 90% by weight, further preferred in a quantity ranging from about 60% by weight to about 85% by weight, each based on the total quantity of said primer. In particular for the reason of providing a solvent, but also for the reason of providing a tackifier, the adding of a co-reagent for the catalyzing agent is useful.

In a preferred composition, said primer comprises at least one catalyzing agent in a quantity ranging from about 0.003% by weight, preferred from about 0.35% by weight, to about 4.5% by weight, at least one co-reagent for said catalyzing agent in a quantity ranging from about 0.02% by weight, preferred from about 0.03% by weight, to about 4% by weight, furthermore at least one elastomer, preferred at least one butyl rubber and/or EPDM, even further preferred exactly one butyl rubber, in a quantity ranging from about 6% by weight to about 14% by weight, as tackifier at least one hydrocarbon resin in a quantity ranging from about 12% by weight to about 20% by weight, preferred to about 18% by weight, and as solvent a such based on petrol in a quantity ranging from about 65% by weight to about 80% by weight, wherein the weight percentage ranges are each based on the total quantity of said primer. Furthermore, the mentioned weight percentage ranges can each be used preferably alone, not only in the mentioned specific composition, in said primer. Further preferred, exactly one primer is used in the anti-corrosion system according to the invention.

Besides said at least one elastomer and said at least one cross-linking agent, said at least one-layered first tape advantageously comprises at least one filler, carbon black, titanium dioxide, at least one antioxidant, at least one hydrocarbon resin, at least one stabilizer, in case of providing an adhesive layer at least one polymer adhesive agent, and/or at least one oil as plasticizer. Especially preferred, said first tape comprises a process oil as plasticizer, preferred in a quantity ranging from about 2% by weight to about 10% by weight, further preferred in a quantity ranging from about 3.5% by weight to about 8% by weight. Preferred, said first tape comprises a tackifier, in particular such selected from the group of hydrocarbon resins, in a quantity ranging from about 6% by weight to about 25% by weight, further preferred in a quantity ranging from about 8% by weight to about 18% by weight. Further preferred, said first tape comprises at least one filler, selected from the group of powdery mineral fillers or of mineral and/or organic fibrous fillers, as for example talcum, zinc oxide, cellulose fibers and the like. Especially preferred, said first tape comprises at least one filler in a quantity ranging from about 10% by weight to about 25% by weight, further preferred in a quantity ranging from about 13% by weight to about 22% by weight. Furthermore, said first tape advantageously comprises at least one antioxidant, preferred a mixture of various antioxidants, in a quantity ranging from about 0.1% by weight to about 1% by weight, further preferred in a quantity ranging from about 0.2% by weight to about 0.5% by weight. As far as carbon black is present, said first tape can comprise carbon black in a quantity ranging from about 2% by weight to about 10% by weight, further preferred in a quantity ranging from about 3% by weight to about 9% by weight. As stabilizer, which may also be referred to as dispersing agent, for example stearic acid can be used. Said stabilizer is preferably comprised in a quantity ranging from about 0.05% by weight to about 0.5% by weight. As far as titanium dioxide is comprised, which in particular serves as color pigment, it is comprised by said at least one-layered first tape in a quantity ranging from about 1% by weight to about 6% by weight, further preferred in a quantity ranging from about 2% by weight to about 5% by weight. As far as said at least one-layered first tape comprises at least one adhesive agent layer, said at least one-layered first tape preferably comprises at least one polymer adhesive agent in a quantity ranging from about 0.05% by weight to about 0.5% by weight, preferred ranging from about 0.04% by weight to about 0.5% by weight, based on the total quantity of said first tape. Especially preferred in this case, said at least one polymeric adhesive agent is selected from a group of polyethylenes and/or polypropylenes. In case of providing a carrier film made of polyethylenes, said at least one polymer adhesive agent is preferably selected from a group comprising at least one polyethylene. Said at least one polymeric adhesive agent can preferably be used as a master batch, to which preferably color pigments can be added. Based on said at least one polymer adhesive agent, said color pigments can be comprised in a quantity of about 0.5% by weight to about 6% by weight, based on the total quantity of the used polymeric adhesive agent, wherein the rest is formed of the polyethylene and/or polypropylene. All above-mentioned weight percentage ranges are based on the total quantity of said first tape.

In an especially preferred composition, said first tape comprises at least one butyl rubber in a quantity ranging from about 40% by weight to about 66% by weight, preferred to about 59% by weight, if appropriate, at least one EPDM in a quantity ranging from about 6% by weight to about 14% by weight, a process oil in a quantity ranging from about 3% by weight to about 8% by weight, as tackifier a hydrocarbon resin in a quantity ranging from about 8% by weight to about 18% by weight, at least one filler in a quantity ranging from about 12% by weight to about 23% by weight, at least one antioxidant in a quantity ranging from about 0.1% by weight, preferred from about 0.2% by weight, to about 0.4% by weight, if appropriate, carbon black in a quantity ranging from about 4% by weight to about 8% by weight, if appropriate, a stabilizer in a quantity ranging from about 0.1% by weight to about 0.7% by weight, and said at least one cross-linking agent in a quantity ranging from about 0.5% by weight to about 8% by weight, preferred ranging from about 0.8% by weight to about 3% by weight. All of the afore-mentioned weight percentage ranges are based on the total quantity of said first tape. Furthermore, the afore-mentioned weight percentage ranges in connection with the specific composition are such, which can be used commonly and beyond the mentioned specific composition.

As far as in the present invention the term "about" is used for values, value ranges or terms containing values, those values are to be meant which are regarded as professionally usual in this context by a person skilled in the art. In particular comprised by the term "about" are deviations of the mentioned values, value ranges or terms containing values of +−10%, preferred +−5%.

Furthermore, the present invention relates to a method for protecting products from corrosion by using the anti-corrosion system a according to the invention, as above defined, wherein said at least one primer is applied onto the product to be protected and subsequently, at least one at least one-layered first tape is wrapped around respectively applied to said product. Especially preferred in case of the method according to the invention is, that during or after wrapping or applying the first and/or second tape, the temperature is raised, in particular the temperature of the product to be protected. For example in case of pipe plants of each type this can be effected by passing heated material through the pipe system. The anti-corrosion system has the advantage that upon operating the protected product and in particular in case of higher temperatures, i.e. at such of more than 80° C., a continuing crosslinking in the sense of a self-curing occurs, by which an even better anti-corrosion effect of the anti-corrosion system according to the invention can be achieved. Especially preferred in case of the method according to the invention is, if a partly overlapping of said at least one-layered first and/or second tape is made while it is wrapped respectively applied. It is further preferred, if during wrapping respectively applying said at least one-layered first and/or second tape, it is stretched, as this leads to a stronger mechanical hold on the product to be protected. Finally, with the method according to the invention, preferably after wrapping the product with at least one, but also for example two first tapes, a second tape is wrapped around respectively applied to the product, wherein said first tape in particular serves to give mechanical protection, as already described above in connection with the anti-corrosion system according to the invention.

Furthermore, the present invention relates to a method of producing an at least one-layered first tape for an anti-corrosion system as above described, wherein in a first step, a master batch comprising at least one elastomer, selected from a group comprising (block-)co- and/or terpolymers with at least one carbon-carbon-double bond, is provided, wherein it is provided preferably at a temperature of the master batch ranging from about 10° C. to about 80° C., and in a second step, after being cooled down to a temperature in a range from about 10° C. to about 80° C., preferred at a temperature in a range from about 10° C. to about 120° C., further preferred at a temperature from about 50° C. to about 120° C., at least one cross-linking agent, selected from a group comprising at least one reactive resin, is added. Said master batch is produced in a common mixer/kneader and for the purpose of homogenization it is heated to a temperature in a range from about 50° C. to about 220° C., preferred to a temperature from about 150° C. to about 200° C. It can subsequently be stored, preferably at a room temperature of about 20° C. The temperature of the master batch upon starting the mixing with the at least one pre-crosslinking agent may not be higher than 80° C. The mixing in the second step is made in a way that the master batch, preferably cooled down to room temperature, is filled into a preheated mixer, preferably preheated to a temperature in a range from about 50° C. to about 80° C., and at the same time or subsequently, the cross-linking agent is added. Caused by the sequence of adding the cross-linking agent as well as due to the selected temperature range(s), in this way, a mixture for producing an at least one-layered first tape is received, in which the at least one elastomer is not cross-linked, i.e. no cross-linking reaction is initiated. Said at least one elastomer and said at least one cross-linking agent of the method according to the invention are in this case such being defined above with regard to the description of the anti-corrosion system according to the invention and of the at least one-layered first tape comprised by it. Preferably, said master batch is produced by adding all possible and above described ingredients for the at least one-layered first tape except for said at least one cross-linking agent. The sequence of adding the various other components is here not relevant. All components except for said at least one cross-linking agent for producing the master batch can be filled into the mixer as a mixture or separately and being mixed in the mixer, and subsequently heated for homogenization. Especially preferred, the heating is effected upon mixing the master batch, in particular by using common agitators which are known to a person skilled in this technical field.

Preferably, after admixing the cross-linking agent, it is mixed for a maximum of about 5 min, preferred about 1 min to about 3.5 min, in particular by kneading. The mixing can be carried out in a way that at first, the master batch is produced and cooled down to a temperature of a maximum of 80° C., so that the mixer is also preheated correspondingly. After that, said at least one cross-linking agent is mixed into the master batch. This procedure can also be applied, if the master batch is stored, wherein it is filled into the preheated mixer preferably at room temperature of 20° C.

Preferably, in case of the method according to the invention, after admixing said at least one cross-linking agent, the received mixture is cooled down from the above-indicated mixing temperature to a temperature in a range from about 20° C. to about 80° C., preferred to a temperature in a range from about 20° C. to about 60° C. Especially preferred, the cooling is made after the mixture has been preferably immediately delivered from the mixer, preferably onto rollers. By means of this cooling step a cross-linking is safely prevented.

The present invention is explained in more detail based on the following examples. Here, it should be mentioned in advance that the features indicated in the examples are such which may be combined with each single or with each other of all features described in the general description. In particular, the composition of the first and second tape and of the primer is just an example, and may also be different, wherein for example the first tape may even comprise no EPDM.

An exemplary composition of the first tape comprises 45% by weight of uncrosslinked butyl rubber, received by co-polymerization of isobutylene and isoprene having a Mooney viscosity ML(1+8) at 125° C. of about 55 MU, 10% by weight of an EPDM, produced with ethylidene norbornes as diene, 5% by weight of a process oil hardened by hydrogenation, 15% by weight of a hydrocarbon resin as tackifier, 18% by weight of talcum as filler with a residue at 60 μm in a sieve analysis according to DIN 66165 of 2%, 5% by weight of carbon black and 2% by weight of a phenolic resin, namely an octylphenol-formaldehyde resin, as cross-linking agent.

A primer used in an anti-corrosion system according to the invention comprised 10% by weight of a butyl rubber, being identical to the one used in said first tape, 15% by weight of a hydrocarbon resin as tackifier, identical to the one used in said first tape, 74.25% by weight of a petrol-based solvent, and 0.75% by weight of a catalyst/co-reagent mixture of tin chloride, zinc chloride and triallyl cyanurate.

Inside said first tape at half of its thickness, a polyethylene film with a thickness of 50 μm is provided as anti-jackknife break. Thus, said first tape according to the invention can be addressed as a two-layered symmetrical tape, comprising one layer formed by the anti-jackknife break and another layer, which is on both sides of the anti-jackknife break made of an identical material as above described, comprising the elastomers and the cross-linking agent.

A further exemplary composition of the first tape comprises 49% by weight of an un-crosslinked butyl rubber, received by co-polymerization of isobutylene and isoprene, with a Mooney-viscosity ML(1+8) at 125° C. of about 55 MU and an average molecular weight $M_w$ of about 450,000, 6% by weight of a process oil hardened by hydrogenation, 14% by weight of a hydrocarbon resin as tackifier, 18% by weight of talcum as filler with a residue at 60 μm in a sieve analysis according to DIN 66165 of 2%, 2% by weight of a phenolic resin, namely an octylphenol-formaldehyde resin, as cross-linking agent as well as 1% by weight of other additives such as antioxidants and dispersing agents. In this case, said first tape comprised a carrier film made of electron-beam cross-linkable polyethylene of medium density in a quantity of 97% by weight and color pigments in a quantity of 3% by weight, each based on the total quantity of the carrier film. Between carrier film and the layer comprising elastomer and cross-linking agent, an adhesive layer was provided which comprised 35% by weight of a polyethylene of higher density, 15% by weight of an EPDM, produced with 5-ethylidene-2-norbornes as diene, and 50% by weight of a pre-crosslinked butyl rubber having a Mooney viscosity ML(1+3) at 127° C. of about 86 MU, wherein the weight percentage ranges are each based on the total quantity of the adhesive layer.

An alternative primer to be used in an anti-corrosion system according to the invention comprised 9% by weight of an un-crosslinked butyl rubber as above described in connection with the two exemplary compositions of the first tape, 18% by weight of a hydrocarbon resin as tackifier, which may not be identical to the hydrocarbon resin in the material of said at least first tape, 70% by weight of a petrol-based solvent and 0.005% by weight of a zinc stearate as catalyst, wherein the rest was added in the form of a color pigment in the form of carbon black, wherein the weight percentage ranges are based on the total quantity of the primer.

The above described alternative first tape according to the invention was thus formed as a three-layered tape, of one layer formed by the carrier film, another layer formed by the adhesive layer and another layer formed by the layer of the material of said first tape.

As second tape such tape was used consisting of a polyethylene with a thickness of 500 μm, having a layer of butyl rubber on one side, wherein between the polyethylene film and the butyl rubber layer, an adhesive layer comprising about 45% by weight of butyl rubber and about 55% by weight of polyethylene was provided.

Upon producing the mixture containing a cross-linking agent for the first tape, said cross-linking agent is added to the mixture during the production process, as soon as it has reached a temperature of 80° C.

A primer as described above was applied to a pipe using a brush and subsequently, the first tape according to the two alternative embodiments was wrapped diagonally around the pipe, in a way that it was steadily overlapped. Subsequently, the second mechanical protection tape was also wrapped in a shifted and overlapping manner around the first tape with its side comprising the butyl rubber layer. Subsequently, a hot medium (as for example water or oil) with a temperature of about 80° C. to about 100° C., was passed through the pipe. The cross-linking process starts already when the primer gets into contact with the first tape due to the catalytic process initiated by the used catalyzing agent, wherein the cross-linking is accelerated if a hot medium is passed through the pipe. Some days later, the primer, the first tape and the second tape were fused and the cross-linking reaction respectively self-hardening reaction were nearly concluded. The anti-corrosion system applied in such manner was suited for a permanent operating temperature of 100° C. according to DIN EN 12068.

The afore-mentioned invention provides an anti-corrosion system which is on the one hand suitable to adhere firmly to products, even at high temperatures, and which can on the other hand be processed and stored easily and safely.

The invention claimed is:

1. An anti-corrosion system comprising:
a first tape comprising an outer layer and a carrier film,
wherein the outer layer comprising an elastomer and a crosslinking agent,
wherein the elastomer is selected from the group consisting of copolymers, block copolymers and terpolymers, wherein each of said copolymers, block copolymers and terpolymers having at least one carbon-carbon double bond,
wherein the crosslinking agent comprising at least one reactive resin,
wherein the carrier film comprising an adhesive layer on both sides of the carrier film such that one of the adhesive layer is disposed between the outer layer and the carrier film,
wherein the outer layer is disposed only on one side of the carrier film,
wherein the anti-corrosion system further comprises a primer including at least one catalyzing agent to activate the cross-linking agent.

2. The anti-corrosion system according to claim 1, wherein the elastomer is selected from the group consisting of butyl rubber, ethylene-propylene-rubber and ethylene-propylene-diene-rubber and combinations thereof.

3. The anti-corrosion system according to claim 1 wherein the elastomer is selected from the group consisting of copolymers of butyl rubber including isobutylene and isoprene, terpolymers of ethylene and propylene including one unconjugated diene and combinations thereof.

4. The anti-corrosion system according to claim 1, wherein the at least one reactive resin includes at least one phenol resin.

5. The anti-corrosion system according to claim 4, wherein the at least one phenol resin has hydroxymethyl groups.

6. The anti-corrosion system according to claim 4, wherein the phenol resin is made of at least one phenol and at least one aldehyde, selected from the group consisting of formaldehyde, acetaldehyde, benzaldehyde, acrolein and combinations thereof.

7. The anti-corrosion system according to claim 1, wherein the at least one catalyzing agent is selected from the group consisting of tin chloride, zinc chloride, zinc bromide, ferric chloride, antimony chloride, antimony bromide, tin bromide, germanium chloride, cobalt bromide, nickel chloride, organic salts of tin or zinc and combinations thereof.

8. The anti-corrosion system according to claim 1, wherein the first tape includes the elastomer in a quantity ranging from about 40% by weight to about 65% by weight, based on total weight of the tape.

9. The anti-corrosion system according to claim 1, wherein the first tape includes the cross-linking agent in a quantity ranging from about 0.2% by weight to about 10% by weight, based on the total weight of the tape.

10. The anti-corrosion system according to claim 1, wherein the primer includes the catalyzing agent in a quantity ranging from about 0.001% by weight to about 5% by weight, based on the total weight of the primer.

11. The anti-corrosion system according to claim 1 wherein the first tape further includes a composition selected from the group consisting of at least one filler, carbon black, at least one antioxidant, at least one hydrocarbon resin, at least one process oil and combinations thereof.

12. The anti-corrosion system according to claim 1, wherein the primer further includes an elastomer in a quantity ranging from about 4% by weight to about 20% by weight, based on the total weight of the primer.

13. The anti-corrosion system according to claim 1, wherein the primer further includes at least one co-reagent for the catalyzing agent, selected from the group consisting of triallyl cyanurate, triallyl isocyanurate, triallyl phosphate, divinyl benzene and combinations thereof.

14. The anti-corrosion system according to claim 13, wherein the primer includes the co-reagent in a quantity ranging from about 0.01% by weight to about 5% by weight, based on the total weight of the primer.

15. The anti-corrosion system according to claim 1, wherein the primer further includes at least one petrol-based solvent and at least one hydrocarbon resin.

16. The anti-corrosion system according to claim 1, further including a second tape to provide mechanical protection.

* * * * *